United States Patent [19]
Fujimoto

[11] Patent Number: 5,393,133
[45] Date of Patent: Feb. 28, 1995

[54] BRAKE FLUID PRESSURE CONTROL APPARATUS

[75] Inventor: Tsuyoshi Fujimoto, Itami, Japan

[73] Assignee: Sumitomo Electric Industries, Ltd., Osaka, Japan

[21] Appl. No.: 26,035

[22] Filed: Mar. 4, 1993

[30] Foreign Application Priority Data

Mar. 5, 1992 [JP] Japan .............................. 4-011150[U]

[51] Int. Cl.6 ............................................. B60T 15/00
[52] U.S. Cl. .................... 303/119.2; 251/129.2
[58] Field of Search ............... 248/248, 593, 635, 638; 303/119.2, 10, 11, 15–17, 20; 403/220; 251/129.15, 129.16, 129.2

[56] References Cited

U.S. PATENT DOCUMENTS

| | | | |
|---|---|---|---|
| 3,430,901 | 3/1969 | Cauvin | 248/638 X |
| 4,520,987 | 6/1985 | Eguchi et al. | 248/638 X |
| 4,690,465 | 9/1987 | Takeda et al. | 303/119.2 |
| 5,004,207 | 4/1991 | Ishikawa et al. | 248/638 X |
| 5,022,717 | 6/1991 | Heibel et al. | 303/119.2 |
| 5,066,076 | 11/1991 | Tröster | 303/113.1 |
| 5,195,717 | 3/1993 | Benz et al. | 248/638 |

FOREIGN PATENT DOCUMENTS

| | | |
|---|---|---|
| 0052291 | 5/1982 | European Pat. Off. . |
| 0358127 | 3/1990 | European Pat. Off. . |
| 0373551 | 6/1990 | European Pat. Off. . |
| 0456991 | 11/1991 | European Pat. Off. . |
| 3941401 | 1/1991 | Germany . |
| 534400 | 3/1941 | United Kingdom ............... 248/635 |
| 2033515 | 5/1980 | United Kingdom . |
| 2191256 | 12/1987 | United Kingdom . |

Primary Examiner—Robert J. Oberleitner
Assistant Examiner—Alfred Muratori
Attorney, Agent, or Firm—Sandler, Greenblum & Bernstein

[57] ABSTRACT

A brake fluid pressure control apparatus has a solenoid valve and/or other fluid pressure control elements in a housing, and the reactive force resulting from the fluid pressure acting on the fluid pressure control elements is carried by a support member fastened to the housing. The support member is a flat plate member. Mounting tabs are formed integrally to and on the same plane as the support member, projecting outwardly from the ends thereof. The mounting tabs are each fastened to the bracket of the vehicle body through a rubber bushing and mounting case. Thus, the structure used to fasten the control apparatus to the vehicle body is simplified and the number of parts required for installation is reduced.

16 Claims, 4 Drawing Sheets

BRAKE FLUID PRESSURE CONTROL APPARATUS

BACKGROUND OF THE INVENTION

1. Field of the Invention

The present invention relates to a brake fluid pressure control apparatus and, more particularly, to a support plate for mounting a brake fluid pressure control apparatus used in an antilock brake control system or traction control system to the vehicle body.

2. Description of the Prior Art

In a conventional brake fluid pressure control apparatus as shown in FIG. 7, the control apparatus is secured to the vehicle body-side bracket 3 by a mounting bolt 2 fitting into a threaded hole 1a provided in the housing (not shown) holding the solenoid valve or other pressure control elements, or the support member 1 bearing the reactive force of the fluid pressure received by the fluid pressure control elements.

The mounting bolt 2 comprises a regular sequence of male threads 2a, flange 2b, and shank 2c, and the male threads 2a thread into the threaded hole 1a. A mounting case 5 is fit around the shank 2c with a vibration absorbing rubber bushing 4 inside the mounting case 5 and surrounding the shank 2c. The male threaded member 5a of the mounting case 5 is inserted through the hole 3a in the body-side bracket 3, a nut 6 is screwed onto the male threaded member 5a, and the complete brake fluid pressure control apparatus is thus secured to the body.

With this type of brake fluid pressure control apparatus, however, it is obviously necessary to drill a hole in the housing or support member 1 and tap this hole to form the threaded hole 1a if the brake fluid pressure control apparatus is to be thus secured to the body, and this drilling-tapping process takes time.

In addition, this conventional assembly of the brake fluid pressure control apparatus to the body requires a mounting bolt 2, rubber bushing 4, mounting case 5, and nut 6. This large number of parts both increases the difficulty of the assembly task, and increases costs.

In addition, the rubber bushing 4 is needed to absorb the vibrations generated in the control apparatus during the initialization check executed when the engine is started and prevent propagation of the vibrations to the body. This has made it difficult to eliminate the rubber bushing 4 and mounting case 5, and thus simplify the assembly, by reducing the total number of parts.

SUMMARY OF THE INVENTION

The present invention has been developed with a view to substantially solving the above described disadvantages and has for its essential object to provide an improved brake fluid pressure control apparatus.

In order to achieve the aforementioned objective, a brake fluid pressure control apparatus for use in a vehicle comprises a housing, fluid pressure control means housing in said housing, a support member fastened to said housing for bearing a reactive force of the fluid pressure acting on the fluid pressure control elements, said support member integrally having mounting tabs for being fasten to the vehicle.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

The preferred embodiment of a brake fluid pressure control apparatus according to the invention is described below with reference to the figures. The brake fluid pressure control apparatus shown in FIG. 1 to FIG. 4 according to the present invention is used in an antilock brake control system.

In this embodiment, the solenoid valve 12 and other elements used to control the fluid pressure (the fluid pressure control elements) are housed in the housing 11, and the reactive force F resulting from the fluid pressure acting on the fluid pressure control elements is carried by the support member 13 plate fastened to the housing 11.

Figure 1:
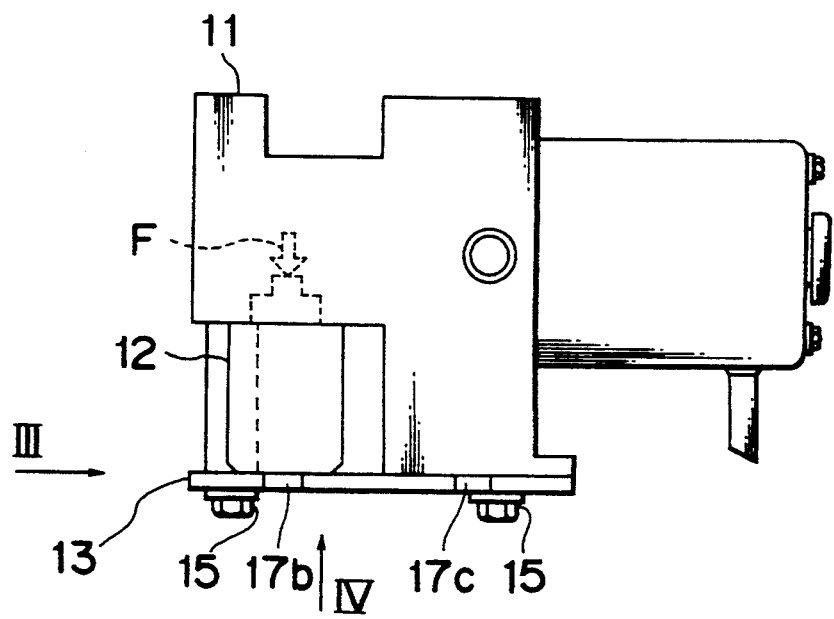
FIG. 1 is a front view of the brake fluid pressure control apparatus according to the preferred embodiment of the present invention.
Figure 2:
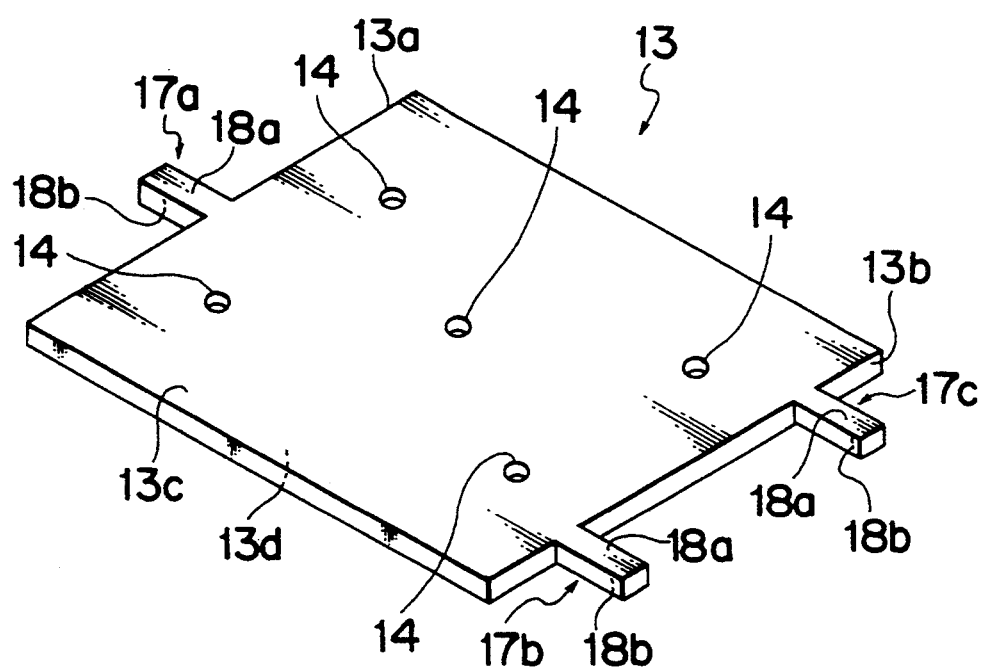
FIG. 2 is an oblique view of the support member.

As shown in FIG. 2, the support member 13 is formed from an approximately rectangularly shaped plate with holes 14 passing through the thickness of the plate. The support member 13 is then fastened to the housing 11 by means of bolt members 15 passing through the holes 14 and threaded into the threaded holes (not shown in the figure) in the housing 11.

The mounting tabs 17a, 17b, and 17c are formed integrally to the plate projecting from the opposite ends 13a, 13b thereof.

The mounting tabs 17a, 17b, and 17c in this embodiment are rectangular in cross section, and extend on the same plane as the support member 13 with the tops and bottoms of the mounting tabs 17a, 17b, and 17c on the same plane as the top and bottom, respectively, of the support member 13.

This support member 13 is formed by stamping steel plate. Because the mounting tabs 17a, 17b, and 17c project from the ends 13a, 13b of the support member 13 on the same plane, they can be formed by stamping at the same time the support member 13 is stamped. The through-holes 14 can also be punched at the same time the support member 13 is stamped.

Figure 3:
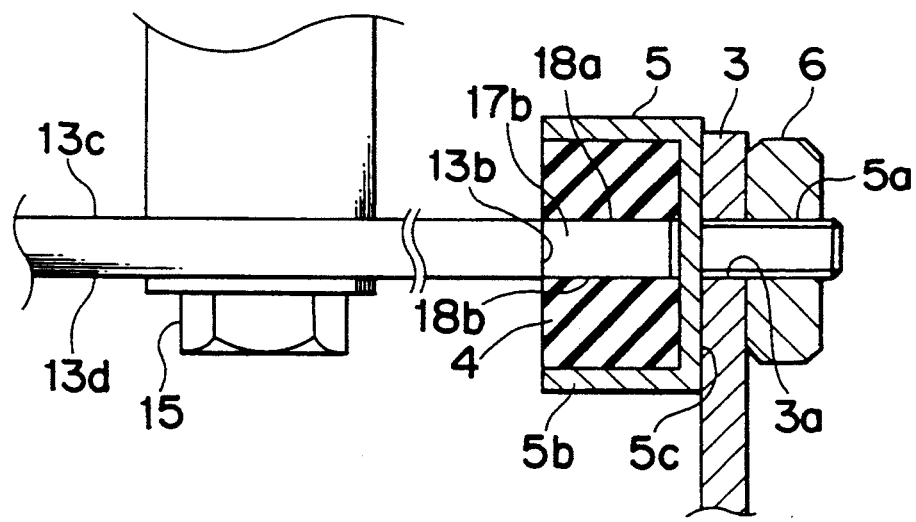
FIG. 3 is a partial cross section of the structure mounting to the body at arrow III in FIG. 1.
Figure 4:
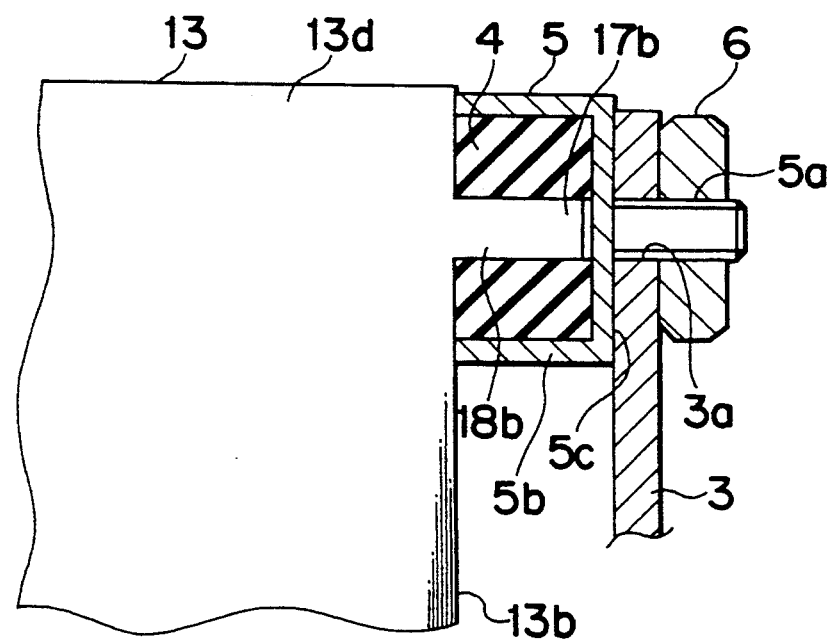
FIG. 4 is a partial cross section of the structure mounting to the body at arrow IV in FIG. 1.

The brake fluid pressure control apparatus comprising this support member 13 is fastened to the body by means of the construction shown in FIGS. 3 and 4.

It is to be noted that while only mounting tab 17b is shown specifically in FIGS. 3 and 4, the same construction is used with the other mounting tabs 17a, 17c to fasten the brake fluid pressure control apparatus at three points to the body.

A thick-walled cylindrical rubber bushing 4 is fit over the mounting tabs 17a, 17b, and 17c, and a mounting case 5 is fit over the rubber bushing 4. A male threaded member 5a projects from the closed end 5c of the cylindrical member 5b of the mounting case 5 fitting over the rubber bushing 4. This male threaded member 5a is inserted through the hole 3a through the body-side bracket 3, and a nut 6 is threaded on. The body-side bracket 3 is therefore sandwiched between the nut 6 and the closed end 5c of the mounting case 5, thus securely fastening the brake fluid pressure control apparatus to the body.

Both the mounting bolt and the threaded hole required to fasten the mounting bolt to the support member in the prior art are therefore unnecessary in a brake fluid pressure control apparatus according to the present invention as thus described because the mounting tabs 17a, 17b, and 17c provided integrally to the support member 13 perform the function of the mounting bolt 2 in the prior art, and the complete control apparatus is fastened to the body-side bracket 3 by means of the rubber bushing 4 and mounting case 5 holding the mounting tabs 17a, 17b, and 17c and fastened by the nut 6.

It is to be noted that the present invention shall not be limited to the above embodiment, and various alternatives are possible. For example, the above embodiment of a brake fluid pressure control apparatus is described as part of an antilock brake control system, but it can also be used in a traction control system.

Figure 5:
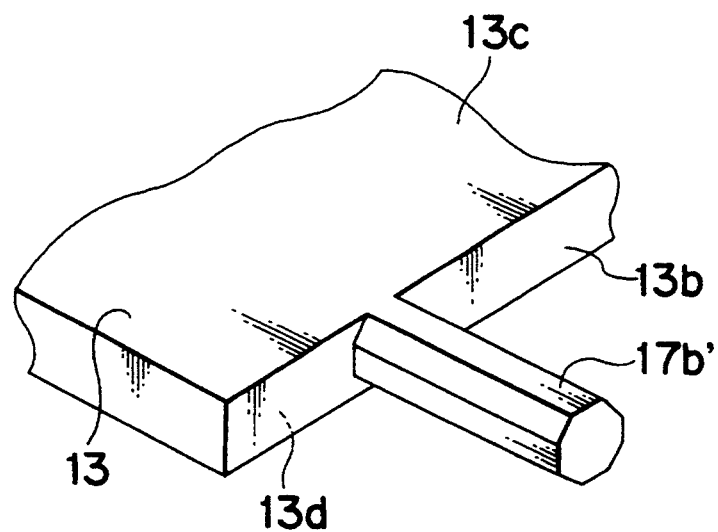
FIG. 5 is a partial oblique view of an alternative embodiment wherein the mounting tabs are octagonal in cross section.

In addition, the mounting tab 17' can be shaped octagonally in cross section as shown in FIG. 5. In this case rectangular mounting tabs can be formed integrally to the support member 13 when the support member 13 is stamped, and the sides of the mounting tabs then chamfered to the finished octagonal shape. In addition, the mounting tabs shall not be limited to a rectangular or octagonal cross section, and a hexagonal or other polygonal or circular cross section can also be used.

Figure 6:
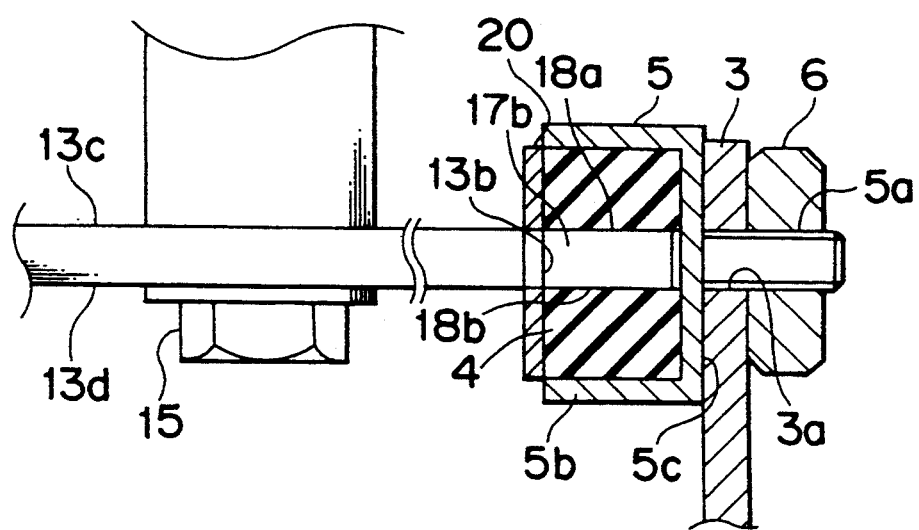
FIG. 6 is a partial cross section of an alternative embodiment wherein a washer is inserted between the rubber bushing and the end of the support member.
Figure 7:
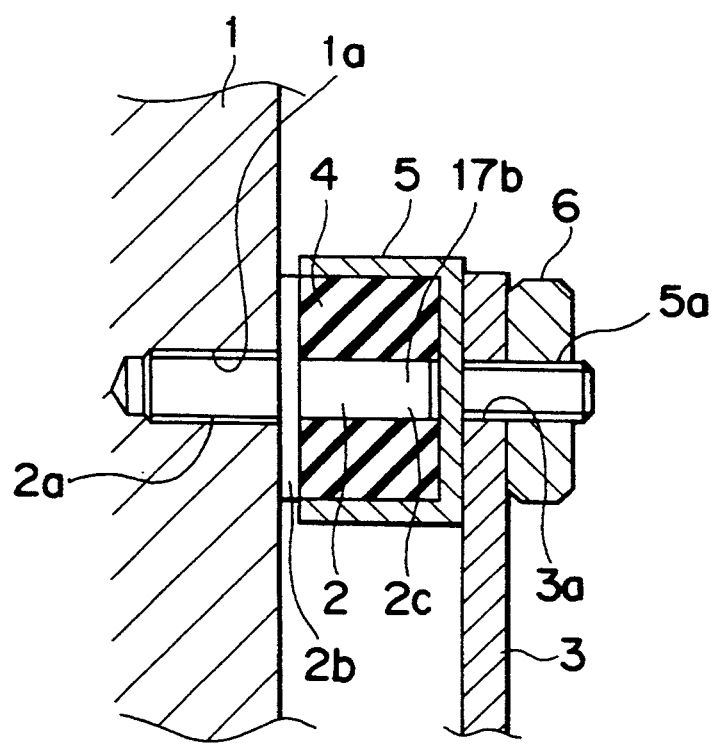
FIG. 7 is a partial cross section of the structure mounting to the body in a conventional brake fluid pressure control apparatus.

In addition, a round washer 20 can also be placed between the rubber bushing 4 and the support member 13 end 13b in the above embodiment as shown in FIG. 6.

The support member 13 is described above as being stamped from steel plate, but the support member can also be die cast or molded from plastic. Finally, the mounting tabs can also be formed integrally to the housing.

As described above, the mounting bolt and threaded hole provided in the housing or support member to mate with the mounting bolt that are required in the prior art to fasten this type of control apparatus to the body can be eliminated with a brake fluid pressure control apparatus according to the present invention because mounting tabs are formed integrally to the support member or housing, and the mounting tabs are used to fasten the control apparatus to the body-side mounting bracket through a rubber bushing and mounting case. As a result, the construction used to fasten the control apparatus to the body can be simplified and the number of parts required for installation can be reduced by the present invention while retaining the rubber bushing structure that prevents propagation of vibrations to the body. It is therefore possible to improve the productivity of the installation procedure, and reduce costs.

When the mounting tabs are formed integrally on the same plane as the plate-like support member in the above embodiment, the mounting tabs can be formed simultaneously by stamping when the support member is stamped from steel plate, and the support member with integral mounting tabs can be produced with a simple manufacturing process. Furthermore, with this construction, the support member can be fastened to the body-side bracket even in cases in which it is difficult to provide a threaded hole for the rubber bushing in the conventional construction because the thickness of the stamped plate is relatively thin.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

Therefore, an object of the present invention is to simplify the structure used for mounting the brake fluid pressure control apparatus to the body, and to reduce the number of parts required for installation.

To achieve this object, a brake fluid pressure control apparatus according to the present invention houses the pressure control elements in a housing, and bears the reactive force of the fluid pressure acting on the pressure control elements by means of a support member fastened to the housing. The invention is further characterized by providing mounting tabs integrally to the support member or housing, and securing the complete control apparatus to the body by means of these mounting tabs.

More specifically, the support member is preferably a plate on which the mounting tabs are integrally formed on the same plane as the plate.

Furthermore, these mounting tabs preferably project at the ends of the support member with the top and bottom surfaces of the mounting tabs being on the same plane as the top and bottom surfaces, respectively, of the support member. The shape of the mounting tabs in cross section can be any desired shape, including rectangular, octagonal, or circular.

In addition, holes are provided through the thickness of the support member from which the mounting tabs project, and the support member is fastened to the housing by bolts passing through these holes and threading into the housing.

In a brake fluid pressure control apparatus according to the present invention, a thick-wall rubber mounting bushing and mounting case are fit in order to each of the mounting tabs. The male threaded member of the mounting case is passed through the holes in the body-side bracket and a nut is threaded on, thus fastening the complete control apparatus to the body. As a result, the mounting bolt and threaded hole mating with the mounting bolt required for installation of a conventional brake fluid pressure control apparatus are not required with the present invention.

In addition, when the mounting tabs project integrally from the support member plate, e.g., when the support member is stamped from steel plate to the specified shape, the mounting tabs and holes through the plate thickness can be simultaneously punched out.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A brake fluid pressure control apparatus for use in a vehicle, said apparatus comprising:
   a housing;
   a magnetic valve for controlling fluid pressure received in said housing and receiving a fluid pressure force directed towards an outside of said housing;
   a support plate connected to said housing, for supporting said magnetic valve against said fluid pressure force, said support plate having a plurality of tabs, each of said tabs having a thickness the same as a thickness of said support plate;
   a rubber bushing mounted to each of said tabs for securing said housing, magnetic valve, and support plate to the vehicle; and
   a mount casing attached to the vehicle for accommodating each of said rubber bushings.

2. The brake fluid pressure control apparatus according to claim 1, each of said tabs having a rectangular cross-sectional shape.

3. The brake fluid pressure control apparatus according to claim 1, each of said rubber bushings comprising a cylindrical member, each of said tabs being received within a central aperture of each of said rubber bushings.

4. A brake fluid pressure control apparatus according to claim 3, each of said mount casings fitting over and receiving said bushing.

5. The brake fluid pressure control apparatus according to claim 4, each said mount casing including a member projecting therefrom for securing said mount casing to a body of the vehicle.

6. A brake fluid pressure control apparatus according to claim 5, said projecting member being threaded.

7. The brake fluid pressure control apparatus according to claim 1, each of said tabs having a polygonal cross-sectional shape.

8. The brake fluid pressure control apparatus according to claim 1, each of said tabs having a circular cross-sectional shape.

9. The brake fluid pressure control apparatus according to claim 1, said support plate comprising means for bearing a fluid pressure reactive force of pressure control elements received within said housing.

10. The brake fluid pressure control apparatus according to claim 1, said support plate comprising a flat plate, each of said tabs projecting outwardly from and in a same plane as said support plate.

11. A brake fluid pressure control apparatus for use in a vehicle, said apparatus comprising:
    a housing;
    a fluid pressure control device provided in said housing for controlling a fluid pressure and receiving a fluid pressure force directed outwardly of said housing;
    a support plate connected to said housing for supporting said fluid pressure control device against said fluid pressure force;
    a plurality of tabs integrally formed with one of said housing and said support plate, said tabs having a thickness the same as a thickness of said one of said support plate or said housing with which said tabs are integrally formed;
    a rubber bushing mounted to each of said tabs for securing said housing, said fluid pressure control device and said support plate to the vehicle; and
    a mount casing attached to the vehicle for accommodating each of said rubber bushing.

12. The brake fluid pressure control apparatus as in claim 11, each of said tabs having a polygonal cross-sectional shape.

13. The brake fluid pressure control apparatus according to the claim 11, each of said tabs having a circular cross-sectional shape.

14. A brake fluid pressure control apparatus according to claim 11, each of said rubber bushings comprising a cylindrical member, said tabs being received within central apertures of said rubber bushings.

15. The brake fluid pressure control apparatus according to claim 11, said mount casings fitting over and receiving said rubber bushings.

16. The brake fluid pressure control apparatus according to claim 11, a member projecting from said mount casings for securing said casings to a body of the vehicle.

* * * * *